United States Patent [19]

Rummage

[11] Patent Number: 4,753,388
[45] Date of Patent: Jun. 28, 1988

[54] DUTY-CYCLE CONTROLLING THERMOSTAT CONSTRUCTION, SYSTEM UTILIZING THE SAME AND METHOD OF MAKING THE SAME

[75] Inventor: Kenneth L. Rummage, Reston, Va.

[73] Assignee: Robertshaw Controls Company, Richmond, Va.

[21] Appl. No.: 77,375

[22] Filed: Jul. 24, 1987

[51] Int. Cl.$^4$ .............................................. F23N 5/20
[52] U.S. Cl. ................................. 236/46 R; 236/78 D
[58] Field of Search ........................... 62/231; 165/12; 236/46 R, 78 D

[56] References Cited

U.S. PATENT DOCUMENTS

| | | | |
|---|---|---|---|
| 4,347,974 | 9/1982 | Pinckapers et al. | 236/46 R |
| 4,410,132 | 10/1983 | Levine | 236/46 R |
| 4,473,183 | 9/1984 | Kensinger et al. | 236/46 R |
| 4,671,457 | 6/1987 | Berkhof | 236/46 R |
| 4,674,027 | 6/1987 | Beckey | 236/46 R X |

OTHER PUBLICATIONS

Thermostat Construction with Ramping of Set Point as a Function of Time-Of-Day.
Thermostat Construction that Places Fixed Constraints on the Air Conditioner "on" Time.

Primary Examiner—William E. Wayner
Attorney, Agent, or Firm—Candor, Candor & Tassone

[57] ABSTRACT

A thermostat construction for controlling the output effect of a heat exchanger means, a system utilizing such a construction and a method of making such a construction are provided, the thermostat construction having a unit for sensing room temperature that is the result of the output effect, having a set-point unit for selecting a desired room temperature to be provided by the heat exchanger, having a changing unit for changing the effective set-point setting of the set-point unit to change the duty-cycle of the heat exchanger, and having a unit for sensing the current duty-cycle of the heat exchanger and for causing the changing unit to change the effective set-point setting to a different temperature setting thereof as the duty-cycle approaches a peak duty-cycle of the heat exchanger so that the current duty-cycles is reduced.

24 Claims, 6 Drawing Sheets

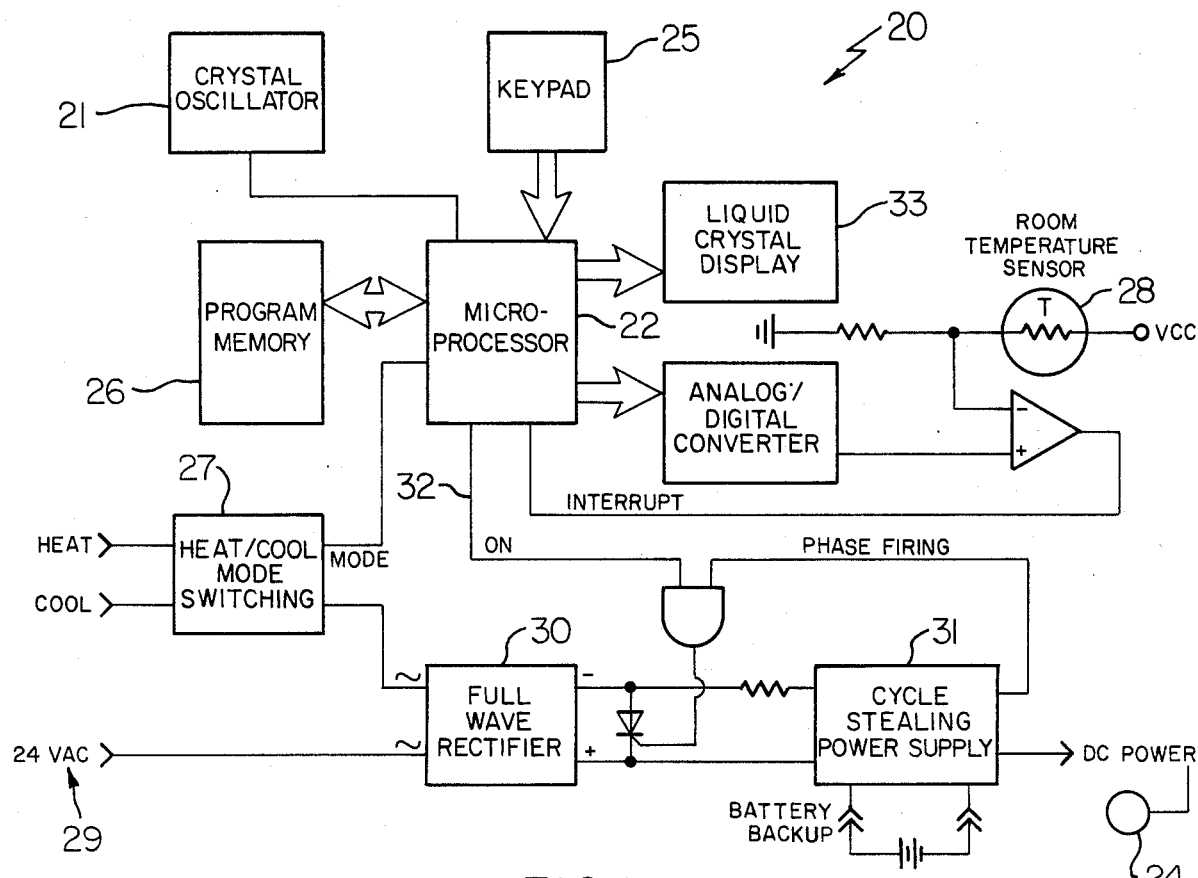

FIG.1

$$TSET = TSET_0 + TSLOPE \int_0^t (DC - DCLIM)\, dt \quad \leftarrow 34$$

$$\text{limit } \{ TSET_u < TSET < TMAX \}$$

where:
 TSET = set-point temperture
 $TSET_0$ = initial set-point temperature
 $TSET_u$ = user selected set-point
 TSLOPE = gain constant (controls maximum slope for TSET) = 2 deg. C/hour for optimal control
 DC = measured air-conditioner duty-cycle
 DCLIM = duty-cycle control limit

FIG.2

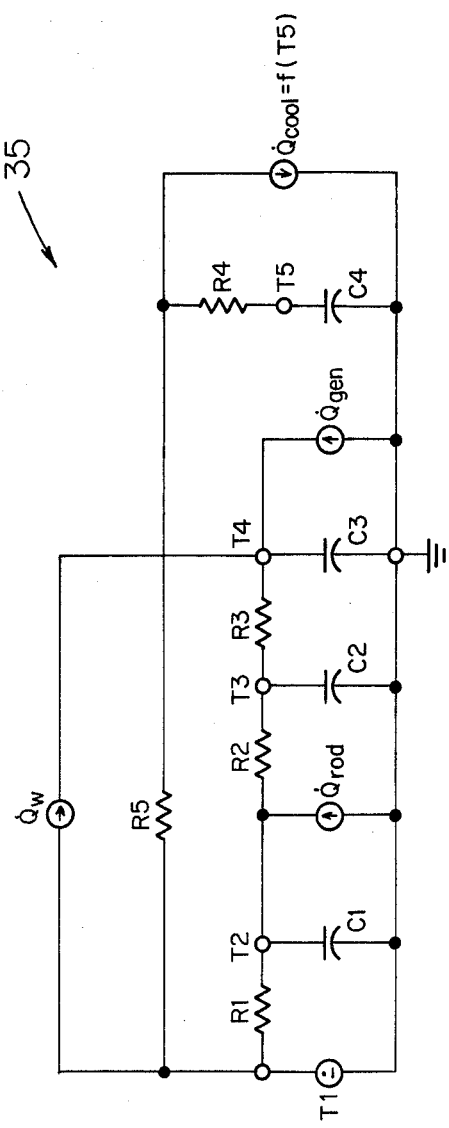

FIG.3

T1 = OUTSIDE AMBIENT TEMPERATURE
T2 = OUTSIDE SURFACE AIR TEMPERATURE
T3 = INSIDE WALL TEMPERATURE
T4 = INSIDE AIR TEMPERATURE
T5 = THERMOSTAT TEMPERATURE
$\dot{Q}_{rod}$ = RADIATION POWER
$\dot{Q}_{gen}$ = INTERNALLY GENERATED POWER
$\dot{Q}_{cool}$ = A/C COOLING POWER
$\dot{Q}_w$ = HUMIDITY INFILTRATION POWER
R1,C1 = THERMAL RESISTANCE & CAPACITANCE OF OUTSIDE SURFACE AIR
R2,C2 = THERMAL R & C OF WALLS
R3,C3 = THERMAL R & C OF INSIDE AIR MASS
R4,C4 = THERMAL R & C OF THERMOSTAT
R5 = DRY AIR INFILTRATION RESISTANCE

LUMPED PARAMETER THERMAL MODEL

THERMAL MODEL STATE EQUATIONS $$\frac{d}{dt}\begin{bmatrix} T2 \\ T3 \\ T4 \\ T5 \end{bmatrix} = \begin{bmatrix} -(W_{1,1}+W_{2,1}) & W_{2,1} & 0 & 0 \\ W_{2,2} & -(W_{2,2}+W_{3,2}) & W_{3,2} & 0 \\ 0 & W_{3,3} & -(W_{3,3}+W_{4,3}+W_{5,3}) & W_{4,3} \\ 0 & 0 & W_{4,4} & -W_{4,4} \end{bmatrix} \begin{bmatrix} T2 \\ T3 \\ T4 \\ T5 \end{bmatrix} + \begin{bmatrix} W_{1,1} & r_1 W_{1,1} & 0 & 0 \\ 0 & 0 & 0 & 0 \\ W_{5,3} & 0 & r_3 W_{3,3} & -r_3 W_{3,3} & r_3 W_{3,3} \\ 0 & 0 & 0 & 0 \end{bmatrix} \begin{bmatrix} T1 \\ \dot{Q}_{rod} \\ \dot{Q}_{gen} \\ \dot{Q}_{cool} \\ \dot{Q}_w \end{bmatrix}$$

WHERE: $W_{1,k} = \frac{1}{R_1 C_k}$

FIG.4

DUTY-CYCLE CONTROL LIMIT = .99900   MAXIMUM ROOM TEMP. [C] = 26.50
MAXIMUM DUTY-CYCLE = .96095   MAX. AMBIENT TEMP [C] = 43.90
ENERGY CONSUMPTION [KWH] = 85.07

DUTY-CYCLE CONTROL LIMIT =.50000   MAXIMUM ROOM TEMP. [C]=29.29
MAXIMUM DUTY-CYCLE = .63333   MAX. AMBIENT TEMP. [C]=43.90
ENERGY CONSUMPTION [KWH]=71.07

% DUTY-CYCLE ------ ----      AVERAGE DUTY-CYCLE = 51.03434
TURN-ON TEMPEATURE - ---- -—   MAXIMUM ROOM TEMP. = 75.40
TURN-OFF TEMPERATURE ———      TOTAL A/C RUNNING HOURS = 14.53
MAXIMUM DUTY-CYCLE = 94.63107  DEGREE SET-POINT = 72

DUTY-CYCLE CONTROLLING THERMOSTAT CONSTRUCTION, SYSTEM UTILIZING THE SAME AND METHOD OF MAKING THE SAME

BACKGROUND OF THE INVENTION

1. Field of the Invention

This invention relates to a new thermostat construction for controlling the output temperature effect of a heat exchanger and to a system utilizing such a thermostat construction, as well as to making such a thermostat construction.

2. Prior Art Statement

It is known to provide a thermostat construction for controlling the output temperature effect of a heat exchanger, the thermostat construction having means for sensing room temperature that is the result of the output effect, said thermostat construction having a set-point means for selecting a desired room temperature to be provided by the heat exchanger, the thermostat construction having changing means for changing the effective set-point setting of the set-point means to change the duty-cycle of the heat exchanger. The prior known changing means is provided by a simple ramping of the set-point temperature as a function of time-of-day or by the placing of fixed constraints on an air conditioner "on" time.

SUMMARY OF THE INVENTION

It is one feature of this invention to provide a new thermostat construction with unique means to reduce as much as practical the peak duty-cycle of a heat exchanger being controlled by the thermostat construction.

In particular, it is known that the reduction in the duty-cycle of a residential air conditioner will greatly reduce the peak electrical demand of a plurality of such air conditioning systems. This reduction in peak electrical demand is greatly desired not only by the electric power supplying utilities but also by the consumers as the same results in a reduced energy consumption thereby.

It is also known that high air conditioner duty-cycles occur whenever the cooling load approaches the cooling capacity of the cooling system. Whenever this condition occurs, a slight increase in thermostat set-point temperature can cause a drastic decrease in the air conditioner duty-cycle and this is due to the exponential nature of the cooling curves.

Therefore, it was found according to the teaching of this invention that a control algorithm could be provided that recognizes when the cooling load is approaching the cooling capacity of the cooling system thereof and that a thermostat construction could then take the appropriate action of raising the effective set-point temperature which will automatically result in a lower air conditioning "on" time so that the duty-cycle thereof is reduced.

It is also believed that such a control algorithm can be utilized with a thermostat construction to control the duty-cycle of a heating means by lowering the effective set-point temperature as the heating load is approaching the heating capacity of the heating system.

Accordingly, one embodiment of this invention provides a thermostat construction for controlling the output temperature effect of a heat exchanger means, the thermostat construction having means for sensing room temperature that is the result of the output effect, the thermostat construction having a set-point means for selecting a desired room temperature to be provided by the heat exchanger, the thermostat construction having changing means for changing the effective set-point setting of the set-point means to change the duty-cycle of the heat exchanger, the thermostat construction having means for sensing the current duty-cycle of the heat exchanger and for causing the changing means to change the effective set-point setting to a different temperature setting thereof as the duty-cycle approaches a peak duty-cycle of the heat exchanger so that the current duty-cycle is reduced.

Accordingly, it is an object of this invention to provide a new thermostat construction for controlling the output temperature effect of a heat exchanger, the thermostat construction of this invention having one or more of the novel features of this invention as set forth above or hereinafter shown or described.

Another object of this invention to is to provide a new system for controlling the output temperature effect of a heat exchanger, the system of this invention having one or more of the novel features of this invention as set forth above or hereinafter shown or described.

Another object of this invention is to provide a new method of making such a thermostat construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a block diagram illustrating the new thermostat construction of this invention.

FIG. 2 sets forth the control algorithm of this invention that is utilized by the thermostat construction of FIG. 1 to control the duty-cycle of an air conditioner.

FIG. 3 is a diagram of a system model of this invention that was developed to simulate the thermal response of a residence under the influence of various weather patterns and thermostat algorithms.

FIG. 4 sets forth the set of differential equations which describe the simulation model of FIG. 3.

DESCRIPTION OF THE PREFERRED EMBODIMENT

Figure 5:
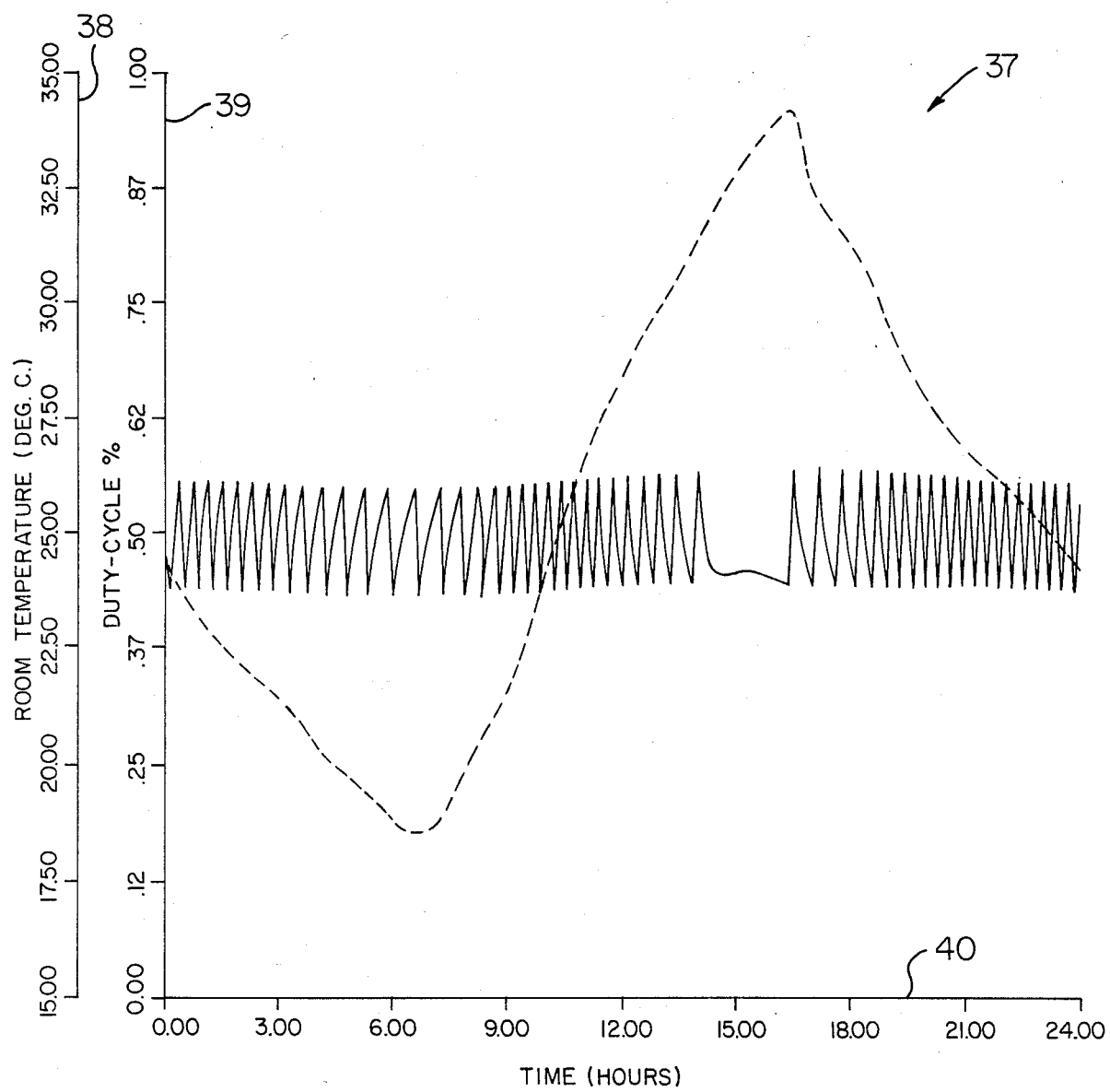
FIG. 5 is a graph of simulated room temperature and air conditioner duty-cycle vs. time-of-day when utilizing a standard thermostat construction.

While the various features of this invention are hereinafter illustrated and described as being particularly adapted to provide a new thermostat construction for controlling the output temperature effect of an air conditioner, it is to be understood that the various features of this invention can be utilized singly or in various combinations thereof to provide a new thermostat construction for controlling other devices, such as a heating means, as desired.

Therefore, this invention is not to be limited to only the embodiments illustrated in the drawings, because the drawings are merely utilized to illustrate one of the wide variety of uses of this invention.

Referring now to FIG. 1, the new thermostat construction of this invention is generally indicated by the reference numeral 20 and comprises a prior known thermostat construction that has been modified according to the teachings of this invention and includes a timing means 21 for supplying time to a microprocessor 22 of the thermostat construction 20 that is programmed in a manner well known in the art to use a particular algorithm of this invention that is generally indicated by the reference numeral 23 in FIG. 2 for controlling the output temperature effect of an electrically operated air conditioner 24 that is schematically illustrated in FIG. 1, the microprocessor 22 in one working embodiment of this invention having replaced the prior used microprocess of the thermostat and comprising a four bit Hitachi microprocessor that can be programmed in a manner hereinafter set forth.

It can be seen that the thermostat construction 20 has a key pad or set-point means 25 for setting the microprocessor 22 to tend to have the output effect of the air conditioning unit 24 produce such selected temperature.

In addition, the thermostat 20 has a program memory 26, a mode selector means 27 and a room temperature sensor 28 each supplying information to the microprocessor 22.

A low voltage alternating current source 29 is adapted to be interconnected to the thermostat construction 20 that includes a full wave rectifier 30 that, through a cycle stealing power supply 31, will supply direct current to the air conditioning unit 24 to operate the same when the microprocessor 22 causes the cycle stealing power supply 31 to operate in a well-known manner by an output being placed by the microprocessor 22 in an output line 32 each time the microprocessor 22 determines that the air conditioner 24 should be in an "on" condition thereof.

The microprocessor 22 also is adapted to operate a liquid crystal display 33 to supply visual information in a manner well known in the art.

As previously stated, the microprocessor 22 of the thermostat construction 20 of this invention is so programmed that the same measures the current duty-cycle of the air conditioner 24 at the end of each cooling cycle thereof and compares this measured duty-cycle to a control reference duty-cycle that has been entered into the microprocessor 22 of the thermostat construction 20 and is the item "DCLIM" of the control algorithm 23 of FIG. 2. The difference term between the measured duty-cycle and the control reference duty-cycle is integrated with respect to time by the microprocessor 22 solving the formula that is generally indicated by the reference numeral 24 in FIG. 2. This integrated error is then added by the microprocessor 22 to the current set-point temperature whereby the microprocessor 22 now tends to operate the air conditioner 24 to produce the output effect that corresponds to this new effective set-point temperature. Thus, a closed looped control system is provided by the thermostat construction 20 of this invention with the control quantity being the duty-cycle of the air conditioner 24 so that the sensed feedback is the measured duty-cycle and the control mechanism is the set-point temperature.

It is believed that such operation of the thermostat construction 20 of this invention utilizing the algorithm 23 of FIG. 2 in the above manner will provide superior performance compared to prior methods and will provide the best compromise between customer comfort and peak electrical demand.

The duty-cycle control limit (DCLIM) can be a selected optimum value for a particular building/air conditioner system and this value can be selected at the time of thermostat insulation by the consideration of a few system parameters, such as cooling capacity vs. building size; wall/roof insulation and local weather.

For example, the value of the duty-cycle control limit (DCLIM) can be selected from the range of approximately 40% to approximately 60% and the TMAX can be any selected value, such as 85° F. whereby the thermostat construction 20 will not change the current duty-cycle when ever the room temperature is below the selected set-point temperature or is above the TMAX temperature.

Of course, it is also possible that the value of the duty-cycle control limit (DCLIM) can be automatically computed by the thermostat microcomputer 22 itself (adaptive control) as a function of duty-cycle history. However, it is believed that a constant value entered at installation should give the best performance under changing weather conditions.

A dynamic thermal model was developed to simulate the thermal response of a residence under the influence of various weather patterns and thermostat algorithms. This computer model was utilized to develop and test thermostat algorithms which will reduce the peak duty-cycle of an air conditioning system and a diagram of the system model is generally indicated by the reference numeral 35 in FIG. 3. Although the actual system 35 is a distributed parameter system (a distributed parameter model would also describe the spatial distribution of temperature), it can be adequately simulated as a lumped parameter system for the purposes of this invention. This model 35 provides capability for simulating the following system characteristics:

I. Thermal dynamics of:
  A. Walls
  B. Inside air mass
  C. Thermostat
  D. Outside walls to ambient heat transfer
II. Diurnal variation of:
  A. Outside ambient temperature
  B. Solar radiation
  C. Relative humidity
III. Simulation of:
  A. Infiltration of dry air
  B. Humidity infiltration
  C. Thermal radiation
  D. Internally generated heat
  E. Air-conditioner cooling characteristics
IV. Control algorithm simulation The thermal model 35 is an analogy to an electrical network. The following quantity analogies can be applied:

| Electrical Network | Thermal System |
|---|---|
| Voltage | Temperature (deg. C.) |
| Current | Heat Transfer Rate (watts) |

| Electrical Network | Thermal System |
|---|---|
| Resistance | Thermal Resistance (deg. C./watt) |
| Capacitance | Thermal Capacitance (joules/deg. C.) |

These thermal parameters for a given house design can be computed from a knowledge of the following parameters of the construction materials.

A. Floor area and surface area
B. Volume and density
C. Specific heat and thermal conductivity
D. Cooling system capacity Solar radiation, ambient temperature, and relative humidity functions are provided to the computer model 35 via actual weather data representing the geographic location of interest. The cooling system heat transfer rate is a complex function of temperature differentials, humidity ratios, and cooling coil dynamics. The computer model provides for this simulation. However, due to the involved nature of this subject, cooling system simulation will not be discussed here.

The set of differential equations which describe the simulation model are generally indicated by the reference numeral 36 in FIG. 4. These equations in matrix form comprise a fourth order system of state equations. The state vector consists of the four temperatures T2 through T5. This vector forms the set of dynamically independent variables in the system. The ambient temperature along with the four heat transfer inputs (power sources) form the vector of time variant system inputs.

This system of differential equations is solved for the state variables T2 through T5. The simulation program solves this system of equations by first computing a discretetime equivalent set of equations (difference equations) for a given time step interval. The recursive solution for the state variables is then accomplished by the state transition technique.

The simulation model 35 was designed to provide 24 hour simulations for the evaluation of different thermostat algorithms. As previously stated, the control algorithm 23 of this invention which evolved from utilizing this model 35 as a development tool is illustrated in FIG. 2.

The control characteristics of this unique control algorithm 23 are listed below:

I. Excellent duty-cycle reduction is achieved.
II. The algorithm is relatively easy to program for a microcomputer.
III. The control equation is a continuous operator (no conditional checks are required).
IV. This control does not reference the air-conditioner cycling to the time of day, thus the natural random cycling of the population of air conditioners is preserved.
V. The duty-cycle control limit and maximum set-point temperature contraints can be easily adjusted to achieve the desired compromise between customer comfort and air-conditioner duty-cycle for any residence (regardless of the cooling system being undersized or oversized).

Figure 6:
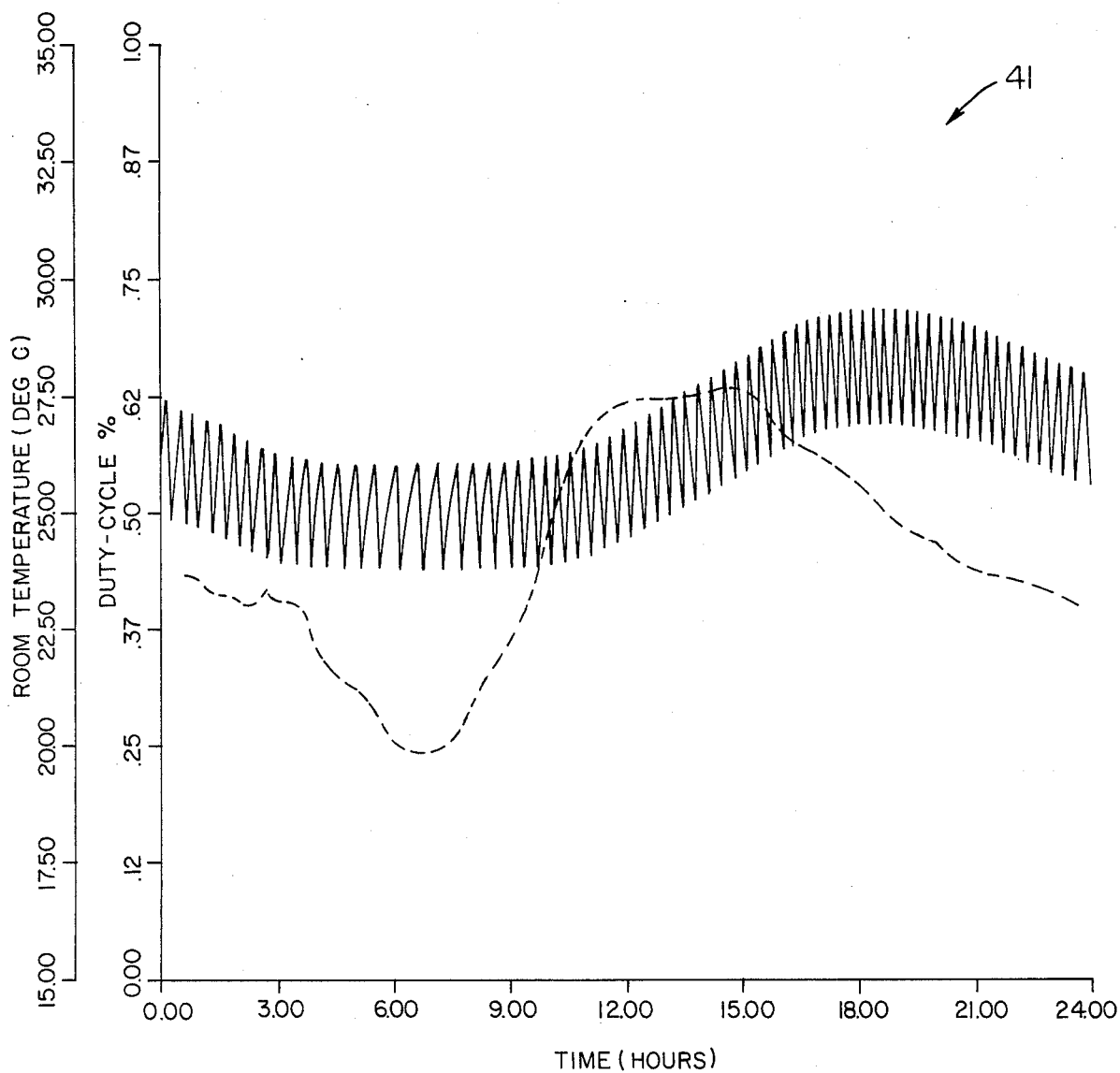
FIG. 6 is a graph similar to FIG. 5 and illustrates simulated room temperature and air conditioner duty-cycle vs. time-of-day when utilizing the thermostat construction of this invention that is illustrated in FIG. 1.

A simulation from the computer model 35 is presented in FIG. 5 of an 1800 sq. ft. residence of stucco construction with a 48,000 btu/hr air conditioner. The weather pattern of this simulation is that of a hot summer day in southern California. FIG. 5 provides a graph 37 of room temperature 38 and air conditioner duty-cycle 39 versus time of day 40. This graph represents the performance of a standard thermostat (no duty-cycle control). The graph 41 of FIG. 6 provides a simulation of the same house and weather conditions under control of the developed duty-cycle controlling thermostat construction 20 of this invention. The following performance measures can be observed from the graphs 37 and 41:

A. Peak duty-cycle was reduced by 32.7%
B. Energy consumption was reduced by 16.4%
C. The algorithm 23 elevated room temperature by 2.8 deg. C. (5.0 deg. F.) to accomplish these savings.

Figure 7:
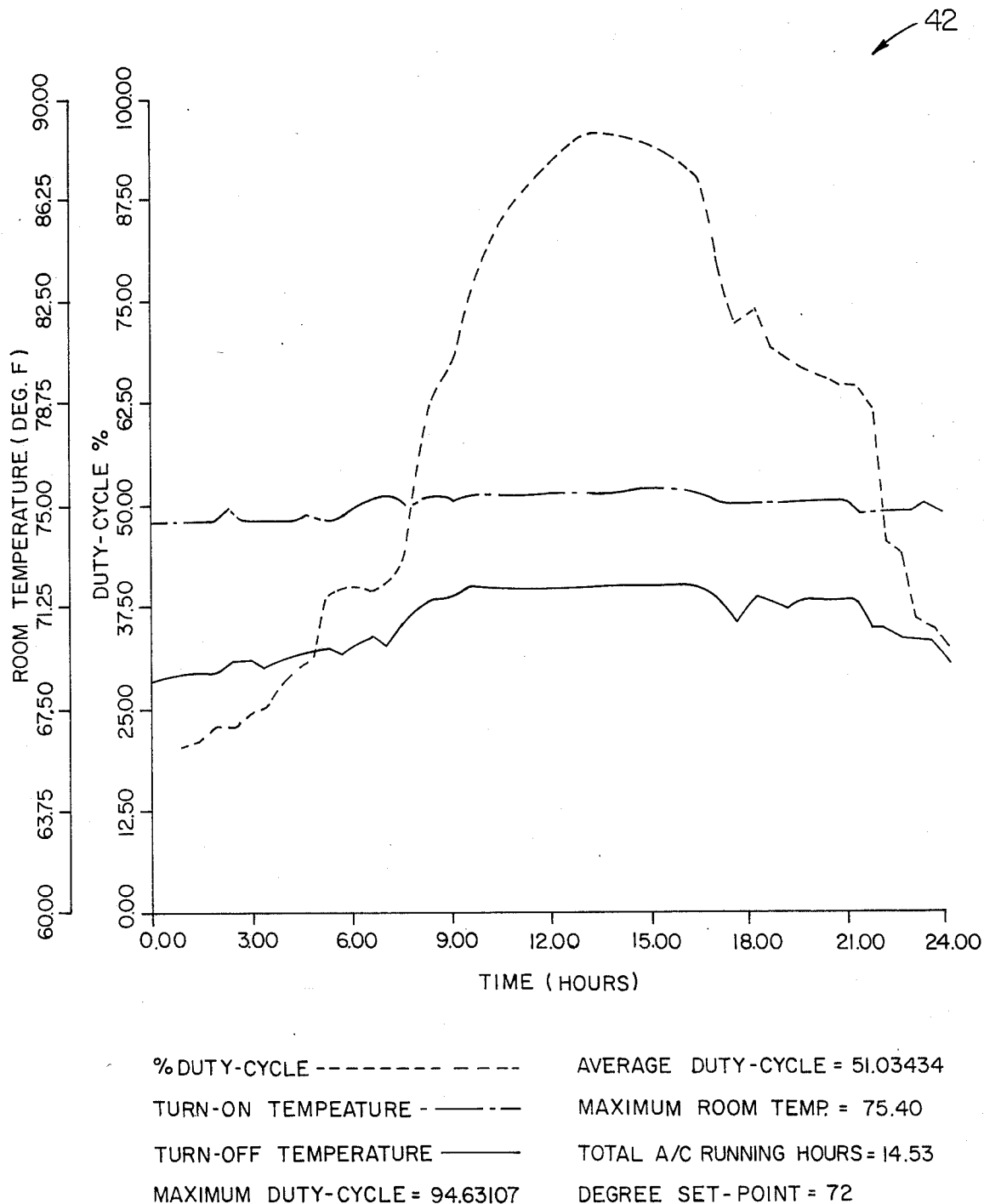
FIG. 7 is a graph similar to FIG. 5 except that the same represents a field test utilizing a standard thermostat at an environmentally controlled test house facility.
Figure 8:
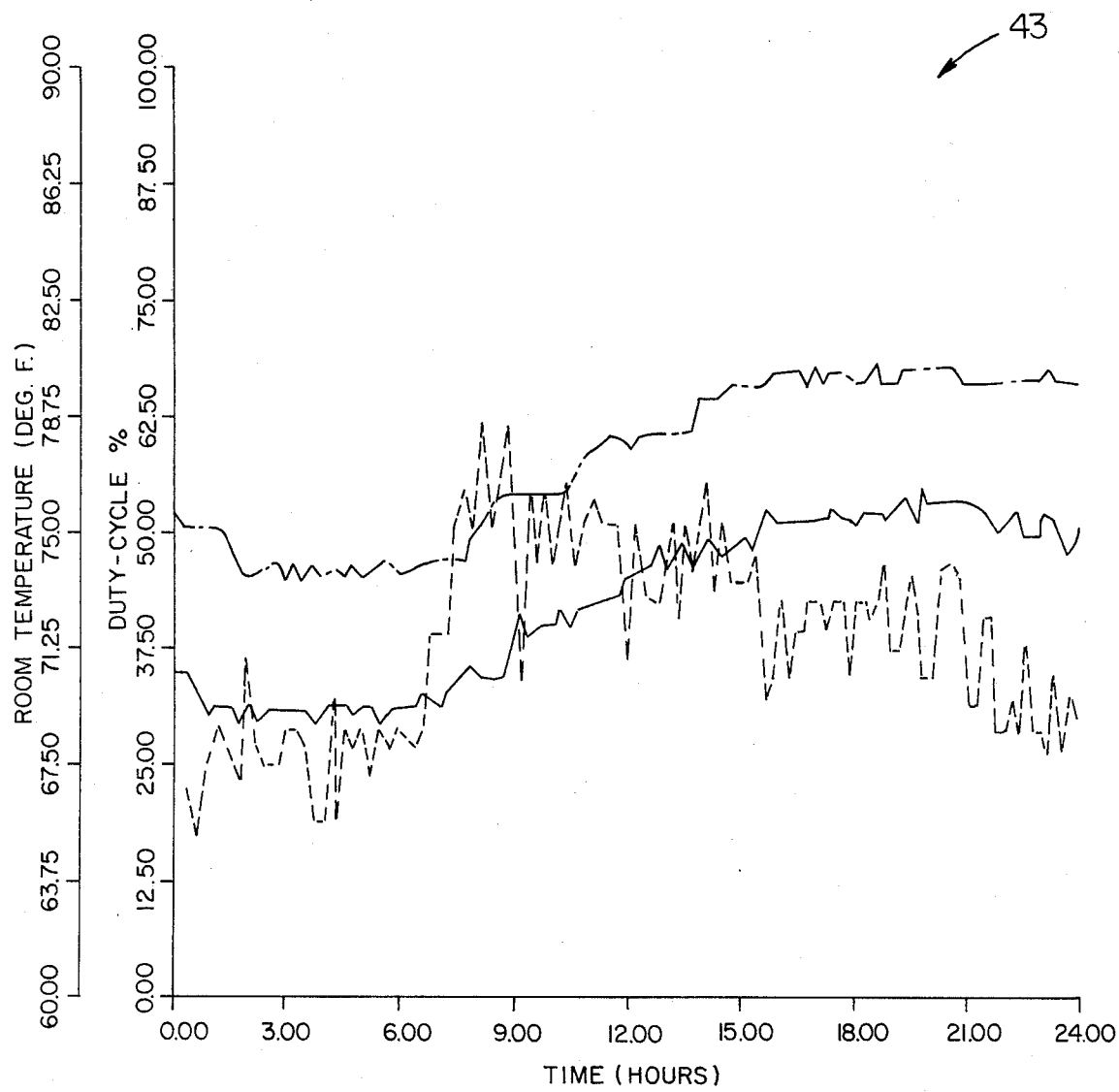
FIG. 8 is a view similar to FIG. 7 and illustrates the same field test thereof while utilizing the new thermostat construction of FIG. 1 of this invention.

Field testing of the thermostat construction 20 of this invention was performed at an environmentally controlled test house facility. At this facility the testing was accomplished with minimal weather influences. The graph 42 of FIG. 7 provides a base line test (utilizing a standard duty-cycle thermostat) for measuring duty-cycle controlling thermostat performance. The graph 43 of FIG. 8 provides the response of the duty-cycle controlling thermostat construction 20 of this invention under the same weather conditions. A comparison of the two graphs 42 and 43 yields:

A. Peak duty-cycle was reduced by 33.2%
B. Total a/c running hours was reduced by 37.8%
C. The algorithm 23 elevated the room temperature by 6.5 deg. F. (3.6 deg. C.) to accomplish these savings.

The operation of the thermostat construction 20 of this invention will now be described.

Assuming that the thermostat construction 20 has a TMAX of 85° and a DCLIM of 50% preprogrammed therein and that the user of the thermostat construction 20 has selected a desired set-point temperature of 75° by using the keypad 25 of FIG. 1 in a manner well known in the art, the thermostat construction 20 will not cause the air conditioner 24 to turn on as long as the room temperature being sensed by the sensor 28 of the thermostat construction 20 is below 75° F. Also, at room temperatures above 75° F., the thermostat construction 20 will not change the current duty-cycle of the air conditioner 24 as long as the current duty-cycle is 50% or less as the algorithm causes the integrated error to be added to the set-point temperature only when the same is a positive number as there is no reduction in the set-point temperature. However, as the current duty-cycle of the air conditioner exceeds 50% in trying to maintain the room temperature at the selected 75° F., the microprocessor causes a reduction in the duty-cycle by adding the resultant integrated error to the selected set-point temperature as previously described to cause a reduction in the current duty-cycle of the air conditioner 24. However, once the added integrated error causes the effective set-point temperature to be 85° F. (TMAX) or higher, the current duty-cycle of the air conditioner 24 is no longer changed. Conversely, as the effective set-point temperature being sensed by the sensor 28 falls from between 85° F. and 75° F., the magnitude of the integrated error that is to be added to the selected set-point temperature of 75° F. is reduced so that the current duty-cycle is increased. This operation of the thermostat construction 20 of this invention is fully illustrated by the graphs 41 and 43 of FIGS. 6 and 8.

As previously stated, it is believed that the thermostat construction 20 of this invention could also be programmed to operate a heating means in the above manner so as to reduce the duty-cycle of a heating means as the current duty-cycle approaches a peak duty-cycle of the heating means by having the integrated error subtracted from the set-point temperature to provide a lower effective set-point temperature.

For example, the unit 24 could be an electrically operated heat pump that operates either on a cooling cycle thereof or on a heating cycle thereof depending upon the mode setting of the switch means 27 of the thermostat construction 20. The microprocessor 22 of the thermostat construction 20 could be preprogrammed so that when the heat pump 20 is in the heating mode thereof, the algorithm 23 would have a TMAX of say 55° whereby the limit of the formula 34 would be $TSET_u > TSET > TMAX$ and the formula 43 would have any positive integrated errors subtracted from $TSET_o$ when the current duty-cycle of the heat pump in its heating mode is larger than DCLIM which could also be a value that had been preselected from the range of approximately 40% to approximately 60% and the sensed temperature is between 55° F. and the initial selected set-point temperature of say 70° F. Thus, the current duty-cycle of the heat pump 24 would not be reduced should the temperature fall to 55° F. or lower and the current duty-cycle would not be reduced as long as the current duty-cycle is smaller than the preprogrammed DCLIM.

It is believed according to the teachings of this invention that by selecting a DCLIM of approximately 50% for the thermostat construction 20, a population thereof in a particular geographical area will be beneficial to both the utility companies supplying that area and to approximately 90% of the consumers of that area so that for those homes, etc. where such 50% DCLIM does not produce a comfortable situation with the operation of their respective heat exchangers 24, those thermostat constructions 20 could have their respective DCLIM's adjusted to optimize the same through changing the DCLIM setting thereof in the field in a manner well known in the microprocessor programming art.

Therefore, it can be seen that the thermostat construction 20 of this invention has means for sensing the current duty-cycle of the heat exchanger 24 and for causing changing means of the thermostat construction 20 to change the effective set-point setting thereof to a different temperature setting thereof as the duty-cycle approaches a peak duty-cycle of the heat exchanger 24 so that the current duty-cycle is reduced, the different temperature setting being an increased temperature if the heat exchanger 24 is operating in the cooling mode thereof and being a decreased temperature if the heat exchanger is operating in the heating mode thereof.

Thus, it can be seen that this invention not only provides a new thermostat construction and method of making the same, but also this invention provides a new system for controlling the output temperature effect of a heat exchanger means.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a thermostat construction for controlling the output temperature effect of a heat exchanger means, said thermostat construction having means for sensing room temperature that is the result of said output effect, said thermostat construction having a set-point means for selecting a desired room temperature to be provided by said heat exchanger means, said thermostat construction having changing means for changing the effective set-point setting of said set-point means to change the duty-cycle of said heat exchanger means, the improvement wherein said thermostat construction has means for sensing the current duty-cycle of said heat exchanger means and for causing said changing means to change said effective set-point setting to a different temperature setting thereof as said duty-cycle approaches a peak duty-cycle of said heat exchanger means so that said current duty-cycle is reduced.

2. A thermostat construction as set forth in claim 1 wherein said means for sensing the current duty-cycle of said heat exchanger means and for causing said changing means to change said effective set-point setting comprises a microprocessor.

3. A thermostat construction set forth in claim 2 wherein said thermostat construction has timing means for supplying time thereto.

4. A thermostat construction as set forth in claim 3 wherein said microprocessor has means for measuring said current duty-cycle of said heat exchanger means at the end of each cycle of operation thereof and comparing the same to a control reference duty-cycle with the difference term thereof being integrated with respect to time to produce an integrated error, said microprocessor having means for combining such integrated error to the current set-point temperature to change the same and provide said different temperature setting thereof.

5. A thermostat construction as set forth in claim 4 wherein said reference duty-cycle is a fixed number that is smaller than 100%.

6. A thermostat construction as set forth in claim 5 wherein said fixed number is in the range of approximately 40% to approximately 60%.

7. A thermostat construction as set forth in claim 3 wherein said heat exchanger means comprises an air conditioner means and wherein said microprocessor has means for measuring said current duty-cycle of said air conditioner means at the end of each cooling cycle thereof and comparing the same to a control reference duty-cycle with the difference term thereof being integrated with respect to time to produce an integrated error, said microprocessor having means for adding such integrated error to the current set-point temperature to change the same and provide said different temperature setting thereof as a higher temperature setting thereof.

8. A thermostat construction as set forth in claim 3 wherein said heat exchanger means comprises a heating means and wherein said microprocessor has means for measuring said current duty-cycle of said heating means at the end of each heating cycle thereof and comparing the same to a control reference duty-cycle with the difference term thereof being integrated with respect to time to produce an integrated error, said microprocessor having means for subtracting such integrated error from the current set-point temperature to change the same and provide said different temperature setting thereof as a lower temperature setting thereof.

9. In a system for controlling the output temperature effect of a heat exchanger means, said system having means for sensing room temperature that is the result of said output effect, said system having a set-point means for selecting a desired room temperature to be provided by said heat exchanger means, said system having changing means for changing the effective set-point setting of said set-point means to change the duty-cycle of said heat exchanger means, the improvement wherein said system has means for sensing the current duty-cycle of said heat exchanger and for causing said changing means to change said effective set-point setting to a different temperature setting thereof as said duty-cycle approaches a peak duty-cycle of said heat exchanger means so that said current duty-cycle is reduced.

10. A system as set forth in claim 9 wherein said means for sensing the current duty-cycle of said heat exchanger means and for causing said changing means to change said effective set-point setting comprises a microprocessor.

11. A system as set forth in claim 10 wherein said system has timing means for supplying time thereto.

12. A system as set forth in claim 9 wherein said microprocessor has means for measuring said current duty-cycle of said heat exchanger means at the end of each cycle of operation thereof and comparing the same to a control reference duty-cycle with the difference term thereof being integrated with respect to time to produce an integrated error, said microprocessor having means for combining such integrated error to the current set-point temperature to change the same and provide said different temperature setting thereof.

13. A system as set forth in claim 12 wherein said reference duty-cycle is a fixed number that is smaller than 100%.

14. A system as set forth in claim 13 wherein said fixed number is in the range of approximately 40% to approximately 60%.

15. A system as set forth in claim 9 wherein said heat exchanger means comprises an air-conditioner means and wherein said microprocessor has means for measuring said current duty-cycle of said air-conditioner means at the end of each cooling cycle thereof and comparing the same to a control reference duty-cycle with the difference term thereof being integrated with respect to time to produce an integrated error, said microprocessor having means for adding such integrated error to the current set-point temperature to change the same and provide said different temperature setting thereof as a higher temperature setting thereof.

16. A system as set forth in claim 9 wherein said heat exchanger means comprises a heating means and wherein said microprocessor has means for measuring said current duty-cycle of said heating means at the end of each heating cycle thereof and comparing the same to a control reference duty-cycle with the difference term thereof being integrated with respect to time to produce an integrated error, said microprocessor having means for subtracting such integrated error from the current set-point temperature to change the same and provide said different temperature setting thereof as a lower temperature setting thereof.

17. In a method of making a thermostat construction for controlling the output temperature effect of a heat exchanger means, said thermostat construction having means for sensing room temperature that is the result of said output effect, said thermostat construction having a set-point means for selecting a desired room temperature to be provided by said heat exchanger means, said thermostat construction having changing means for changing the effective set-point setting of said set-point means to change the duty-cycle of said heat exchanger means, the improvement comprising the step of forming said thermostat construction with means for sensing the current duty-cycle of said heat exchanger means and for causing said changing means to change said effective set-point setting to a different temperature setting thereof as said duty-cycle approaches a peak duty-cycle of said heat exchanger means whereby said current duty-cycle is reduced.

18. A method of making a thermostat construction as set forth in claim 17 and including the step of forming said means for sensing the current duty-cycle of said heat exchanger means and for causing said changing means to change said effective set-point setting to comprise a microprocessor.

19. A method of making a thermostat construction as set forth in claim 18 and including the step of forming said thermostat construction to have timing means for supplying time thereto.

20. A method of making a thermostat construction as set forth in claim 19 and including the steps of forming said microprocessor with means for measuring said current duty-cycle of said heat exchanger means at the end of each cycle of operation thereof and compare the same to a control reference duty-cycle with the difference term thereof being integrated with respect to time to produce an integrated error, and forming said microprocessor with means for combining such integrated error to the current set-point temperature to change the same and provide said different temperature setting thereof.

21. A method of making a thermostat construction as set forth in claim 20 wherein said reference duty-cycle is a fixed number, that is smaller than 100%.

22. A method of making a thermostat construction as set forth in claim 21 wherein said fixed number is in the range of approximately 40% to approximately 60%.

23. A method of making a thermostat construction as set forth in claim 19 and including the steps of forming said exchanger means to comprise an air-conditioner means, forming said microprocessor with means for measuring said current duty-cycle of said air-conditioner means at the end of each cooling cycle thereof and comparing the same to a control reference duty-cycle with the difference term thereof being integrated with respect to time to produce an integrated error, and forming said microprocessor with means for adding such integrated error to the current set-point temperature to change the same and provide said different temperature setting thereof as a higher temperature setting thereof.

24. A method of making a thermostat construction as set forth in claim 19 and including the steps of forming said exchanger means to comprise a heating means, forming said microprocessor with means for measuring said current duty-cycle of said heating means at the end of each heating cycle thereof and comparing the same to a control reference duty-cycle with the difference term thereof being integrated with respect to time to produce an integrated error, and forming said microprocessor with means for subtracting such integrated error from the current set-point temperature to change the same and provide said different temperature setting thereof as a lower temperature setting thereof.

* * * * *